(12) United States Patent
Zillmann (10) Patent No.: US 6,647,751 B2
(45) Date of Patent: Nov. 18, 2003

(54) LOCK FOR A MOTOR VEHICLE STEERING COLUMN

(75) Inventor: Horst Zillmann, Munich (DE)

(73) Assignee: Huf Hulsbeck & Furst GmbH & Co. KG (DE)

( * ) Notice: Subject to any disclaimer, the term of this patent is extended or adjusted under 35 U.S.C. 154(b) by 0 days.

(21) Appl. No.: 10/077,918

(22) Filed: Feb. 20, 2002

(65) Prior Publication Data

US 2002/0116962 A1 Aug. 29, 2002

(30) Foreign Application Priority Data

Feb. 28, 2001 (DE) .......................................... 101 09 609

(51) Int. Cl.⁷ .............................................. B60R 25/02
(52) U.S. Cl. .......................................... 70/186; 70/252
(58) Field of Search .......................... 70/182, 183, 184, 70/185, 186, 252, 127, 139, 422, 379 R, 380, 472, 370, 373, 360, DIG. 62, 223; 292/144, 63, 64, 65, 66, 67, 71, 109, 110, 111, 112, 113, 114

(56) References Cited

U.S. PATENT DOCUMENTS

| | | | | |
|---|---|---|---|---|
| 1,736,900 A | * | 11/1929 | Carpenter | 70/185 |
| 1,907,625 A | * | 5/1933 | Vogt | 70/100 |
| 4,446,709 A | * | 5/1984 | Steinbach | 70/496 |
| 4,581,909 A | * | 4/1986 | Weber | 70/186 |
| 4,583,775 A | * | 4/1986 | Bisbing | 292/64 |
| 4,671,547 A | * | 6/1987 | Weinerman et al. | 292/197 |
| 4,924,685 A | * | 5/1990 | Usina | 70/218 |
| 5,848,540 A | * | 12/1998 | Pieper | 70/252 |
| 5,974,841 A | * | 11/1999 | Naganuma | 70/186 |
| 6,116,660 A | * | 9/2000 | Langkamp et al. | 292/65 |
| 2001/0025516 A1 | * | 10/2001 | Starken | 70/186 |

FOREIGN PATENT DOCUMENTS

| | | |
|---|---|---|
| DE | 199 29 435 | 1/2001 |
| DE | 100 30 688 | 10/2001 |

* cited by examiner

Primary Examiner—Anthony Knight
Assistant Examiner—Michael J. Kyle
(74) Attorney, Agent, or Firm—Bacon & Thomas, PLLC (57) ABSTRACT

A motor vehicle steering column lock includes a locking element that is movable reciprocally by a rotatable control element between a locked and an unlocked position. The control element extends around the locking element and includes two inner bevel surfaces and four terminal surfaces cooperating with two radial locking element projections that are arranged diametrically opposite to each other relative to the control element's axis of rotation. The projections each engage at their ends a bevel surface or one of its two terminal surfaces located in planes extending orthogonal to the control element's axis of rotation. One of the bevel surfaces and its terminal surfaces are offset in the direction of the control element's axis of rotation relative to the other bevel surface and its terminal surfaces, and they are located at a larger distance from and around the control element's axis of rotation as compared with the distance of the other bevel surface and its terminal surfaces from the axis of rotation of the control element. The projections are stationary, and the projection cooperating with the bevel surface that is located farther away from the control element's axis of rotation and with its terminal surfaces is commensurately offset from the projection cooperating with the other bevel surface and with its terminal surfaces along the direction of the control element's axis of rotation, with the former projection having a commensurately longer length than the latter.

12 Claims, 10 Drawing Sheets

LOCK FOR A MOTOR VEHICLE STEERING COLUMN

BACKGROUND OF THE INVENTION a. Brief Summary and Field of the Invention

The invention relates to a lock for locking a motor vehicle steering column, the lock comprising a locking element displaceable reciprocally to-and-fro between locked and unlocked positions and a control element which is rotatable about an axis in opposite directions to-and-fro by a drive to axially displace the locking element, or a drive element cooperating with the locking element, in either direction, the control element surrounding the locking element or its drive element and comprising two inner bevel surfaces which cooperate with two radial projections of the locking element or of its drive element that are situated on diametrically opposed sides of the axis of rotation of the control element, and which each merge at each of the respective two ends into a terminal surface that is situated in a plane orthogonal to the axis of rotation of the control element.

b. Related Art

A lock of this kind is known wherein the locking element may be advanced exactly up to the locked or unlocked position but no farther, not even if the control element should subsequently rotate further, i.e. even if its drive should not instantaneously stop as soon as the locking element has reached the locked or the unlocked position. The locking element or its drive element and the control element are configured in a coaxial manner and cooperate by means of the two radial projections of the inner locking element or its inner drive element that are mutually aligned and opposite diametrically with respect to the axis of rotation of the control element and that are each displaceable orthogonally relative to the axis of rotation of the control element and spring-loaded, and by means of the two inner bevel surfaces of the outer control element and one terminal surface of one bevel surface and the corresponding terminal surface of the other bevel surface, which terminal surfaces are disposed in a common plane that extends orthogonal to the axis of rotation of the control element and each extend up to beside the other or the one of the bevel surfaces, and they cooperate in such a way that the locking element or its drive element shall be commensurately axially displaced upon rotation of the control element in that direction in which the projections move on the bevel surfaces toward the terminal surfaces, and that, when the projections pass from the bevel surfaces to the terminal surfaces, the locking element or its drive element shall be motionless and remain in the attained axial position until the control element is rotated in the opposite direction so that the projections will move on the bevel surfaces away from the terminal surfaces, and the locking element or its drive element will move in the opposite axial direction until the projections move from the bevel surfaces to their other terminal surfaces which also extend in a common plane which extends orthogonal to the axis of rotation of the control element. The projections of the locking element or of its drive element may comprise two pins mounted in a common cross borehole of the locking element or its drive element and being loaded by a common helical compression spring (German patent 44 36 326).

An object of the invention is to further improve the known lock and in particular to further reduce the number of elements of the lock, to further simplify assembly and to further lower manufacturing costs.

BRIEF DESCRIPTION OF THE DRAWINGS

An illustrative embodiment of the lock of the invention is described below in relation to the attached drawings, where.

DETAILED DESCRIPTION OF A PREFERRED EMBODIMENT OF THE INVENTION

The lock illustrated in the drawings comprises a housing 2 sealed by a cover 1 and is used to lock a motor vehicle steering column 3 shown in FIGS. 2 through 5 by means of a locking element 4 cooperating with a tubular locking bush 5 affixed to the steering column 3 and having locking channels 6. The steering column 3 and the locking bush 5 are enclosed by a tube (not shown) to which is affixed the housing 2. The locking element 4 is configured as a bolt rectangular in cross-section and is located in an axially displaceable manner in a bore 7 of matching cross-section in the housing 2, the longitudinal axis 8 of said bore 7 orthogonally intersecting the longitudinal axis 9 of the steering column 3. The term "locking element" as used herein shall include a single element 4 as shown or an assembly (not illustrated) including a drive element and a looking means, the drive element cooperating with a control element to be described below and with the locking means to cause its movement in response to movement of the control element.

Figure 2:
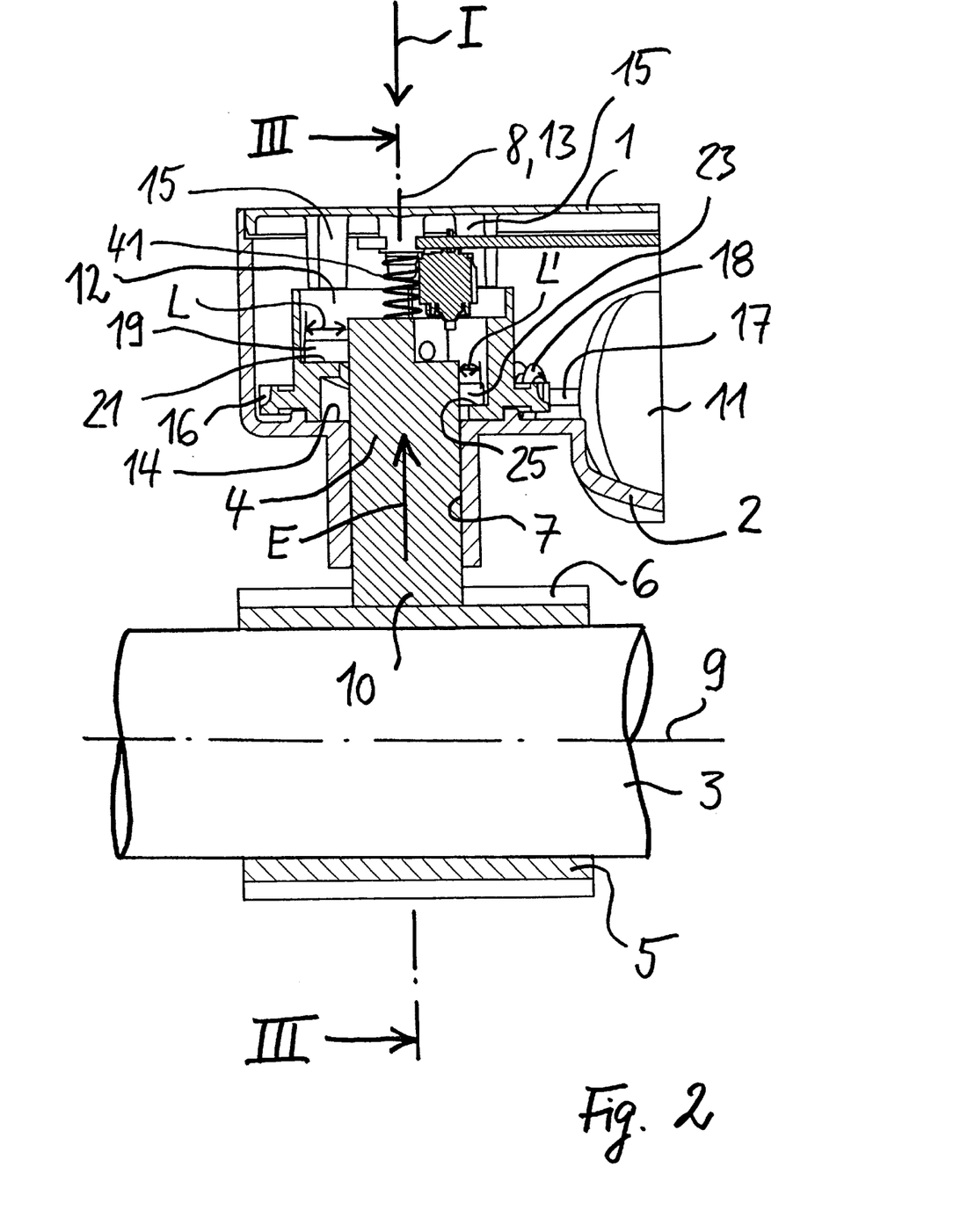
FIG. 2 is a section view taken along line II—II of FIG. 1.
Figure 3:
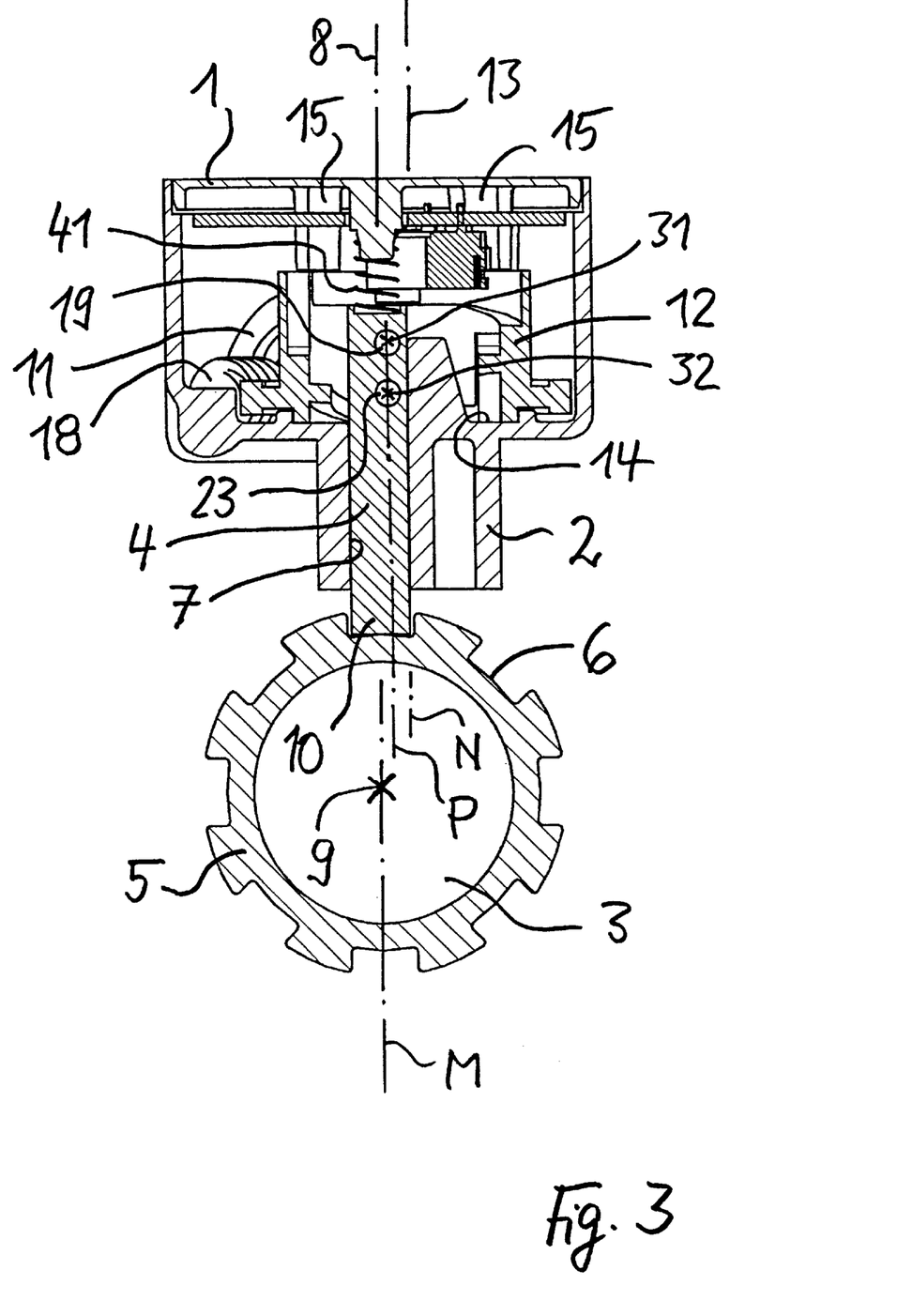
FIG. 3 is a section view taken along line III—III of FIG. 2.
Figure 7:
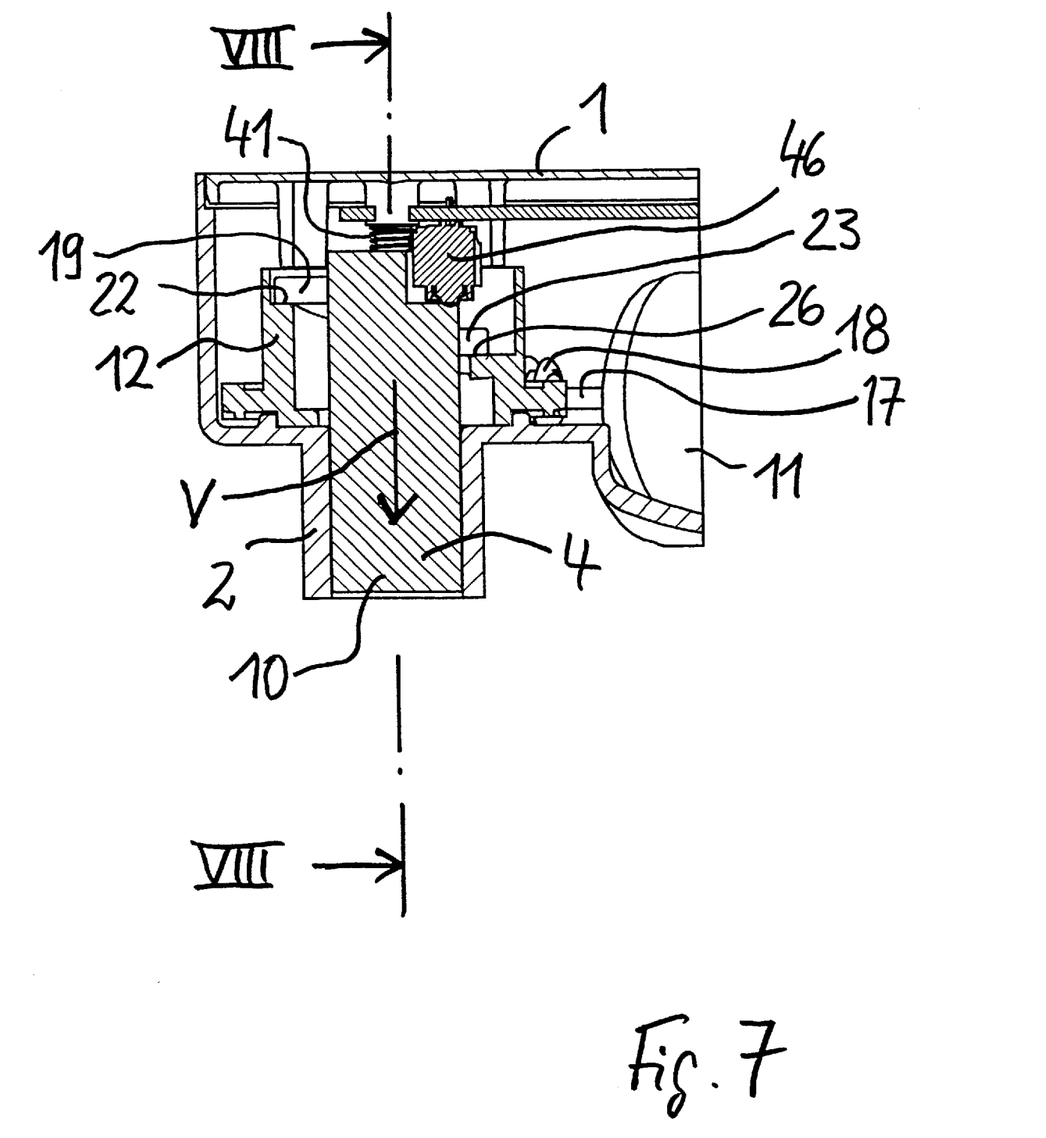
FIG. 7 is a section view taken along line VII—VII of FIG. 6.
Figure 8:
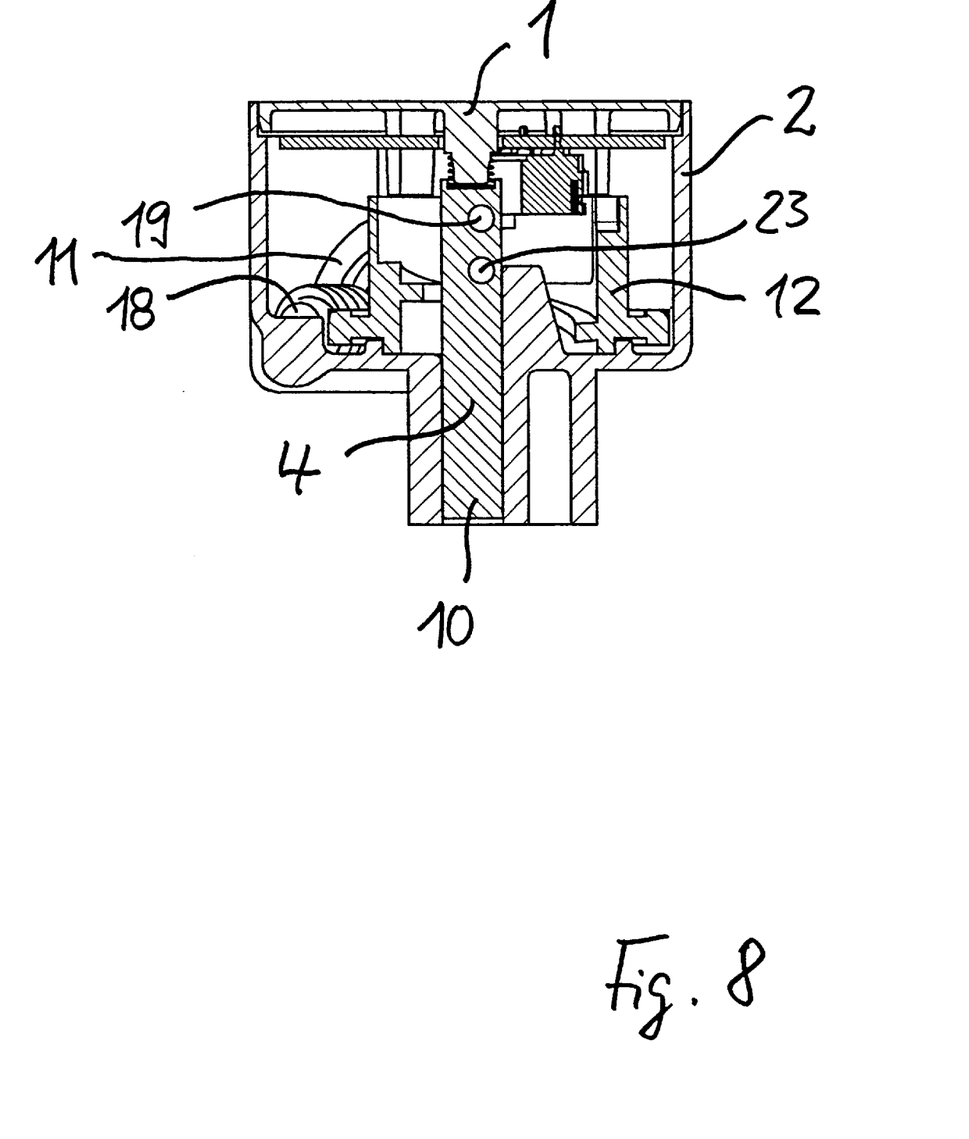
FIG. 8 is a section view taken along line VIII—VIII of FIG. 7.
Figure 9:
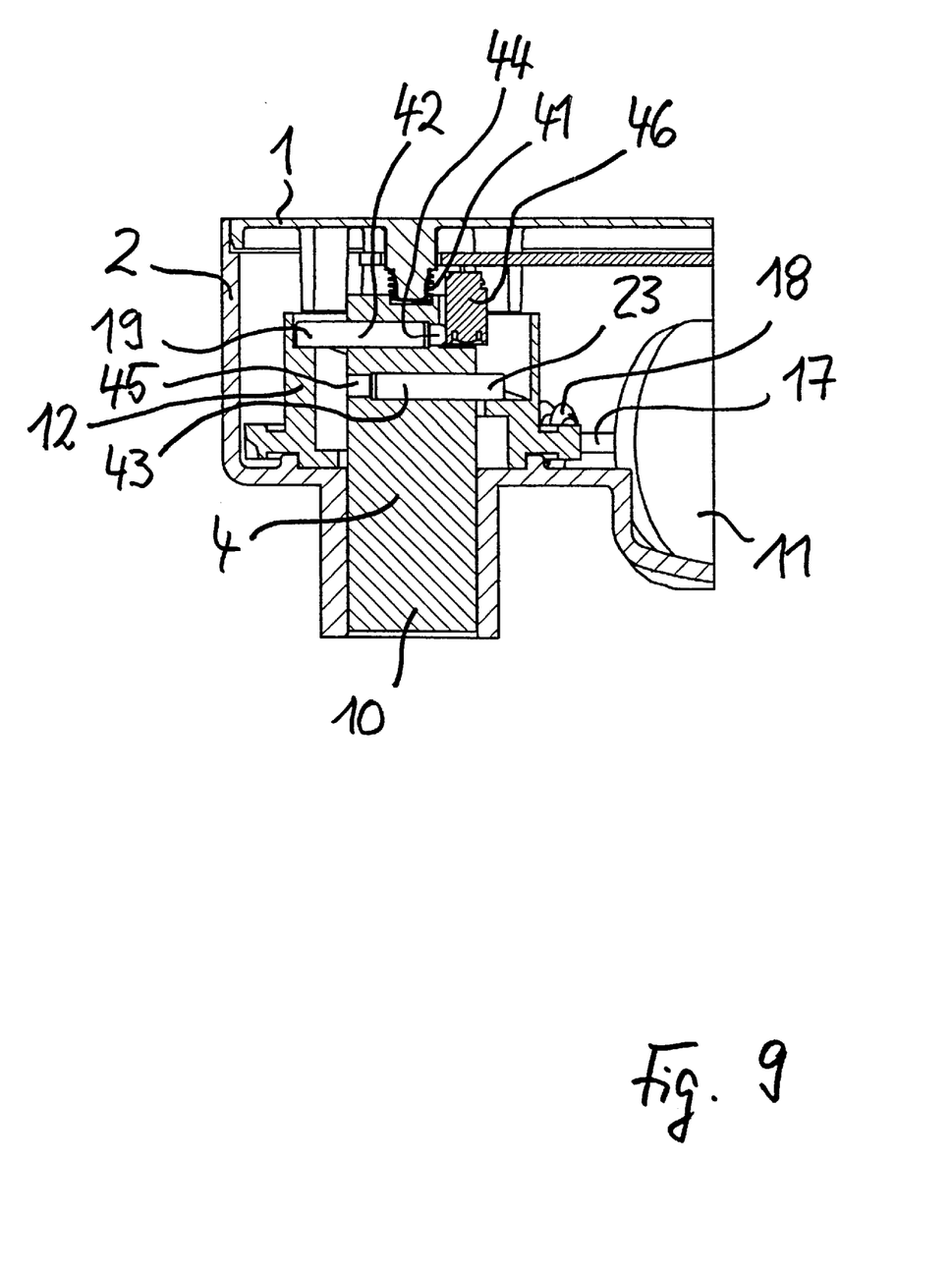
FIG. 9 is a section view taken along line IX—IX of FIG. 6.

The locking element 4 is displaceable reciprocally (to-and-fro) between on one hand a locked position shown in FIGS. 2 and 3 wherein it engages by its end 10, near the steering column 3, a locking channel 6 of the locking bush 5, whereby the steering column 3 is made non-rotational, and on the other hand an unlocked position shown in FIGS. 7 through 9, wherein the locking element 4 no longer engages by its end 10 any locking channel 6 of the locking bush 5 and therefore has released the steering column 3 which then may be rotated.

The invention includes a control element 12 reversibly driven in rotation by a reversible electric motor 11 for the purpose of axially displacing the locking element 4 in one direction into the unlocked position and in the opposite direction into the locked position. The control element 12 is substantially coaxial with the locking element 4 and surrounds the latter. It is further supported as shown in FIG. 3 inside the housing 2 so as to be rotatable about an axis 13 which extends in a plane N and parallel to the longitudinal axis 8 of the bore 7 receiving the locking element 4. The plane N extends parallel to a plane M containing the longitudinal axis 8 of bore 7 and the longitudinal axis 9 of the steering column 3. The control element 12 is arranged between an annular surface 14 of the housing 2 that is coaxial with its axis 13 of rotation and a ring of inner projections 15 of the cover 1, which ring is also coaxial with the axis of rotation 13. The control element includes outer teeth 16 meshing with a drive pinion or worm 18 affixed to the output shaft 17 of the electric motor 11. The electric motor 11 may be a 12 volt DC motor, the direction of rotation of which can be reversed by reversing the applied voltage and which remains stationary in the absence of applied voltage.

The inner locking element 4 is fitted with a first outer projection 19 cooperating with a first inner bevel surface 20 and first and second inner terminal surfaces 21 and 22 of the outer control element 12. The inner locking element 4 is also fitted with a second outer projection 23 cooperating with a second inner bevel surface 24 and third and fourth inner terminal surfaces 25 and 26 of the outer control element 12.

Figures 10, 11, 12:
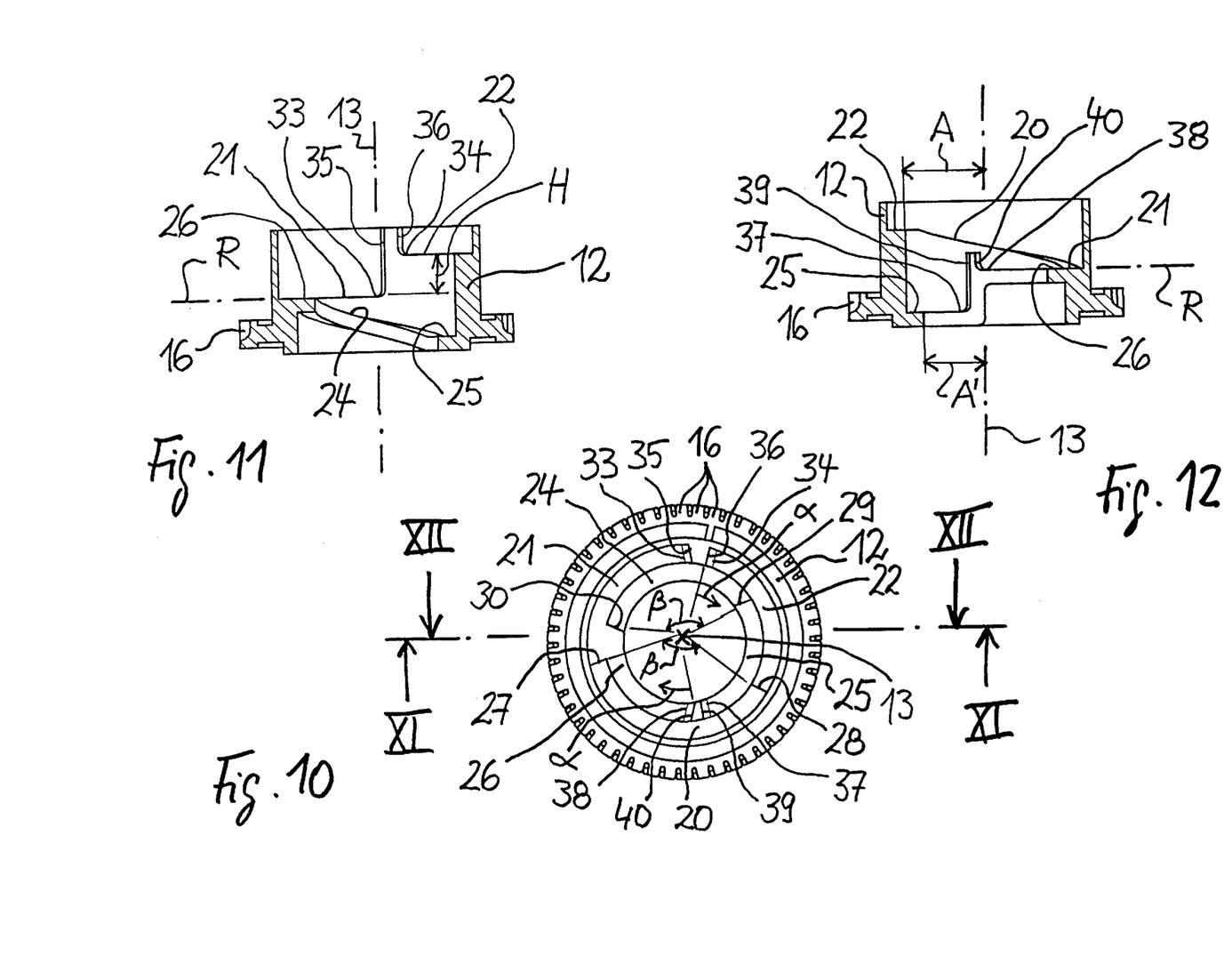
FIG. 10 is a top view of the control element.
FIG. 11 is a section view taken along line XI—XI of FIG. 10.
FIG. 12 is a section view taken along line XII—XII of FIG. 10.

As shown particularly clearly in FIGS. 10 through 12, the first bevel surface 20 of the control element 12 merges at its one end 27 into the first terminal surface 21 and at its other end 28 into the second terminal surface 22. The second bevel surface 24 of the control element 12 merges at both its ends 29, 30 into third and fourth terminal surfaces 25 and 26. The first and second bevel surfaces 20 and 24 of the control element 12 have the same slope. The terminal surfaces 21, 22, 25, 26 are each located in a plane extending orthogonal to the axis of rotation 13 of the control element 12.

The first bevel surface 20 of the control element 12 and its first and second terminal surfaces 21 and 22 are offset by the distance H shown in FIG. 11 along the direction of the axis of rotation 13 of the control element 12 with respect to the second bevel surface 24 of the control element 12 and its third and fourth terminal surfaces 25 and 26. Furthermore, the first bevel surface 20 of the control element 12 and its first and second terminal surfaces 21 and 22 are located a distance A from the axis of rotation 13 of the control element 12, which distance A is larger than that distance A' at which the second bevel surface 24 of the control element 12 and its third and fourth terminal surfaces 25 and 26 are located relative to the axis of rotation 13 of the control element 12.

The first projection 19 and the second projection 23 of the locking element 4 project therefrom substantially radially with respect to the axis of rotation 13 of the control element 12 that drives the locking element 4, specifically on mutually diametrically opposite sides relative to the axis of rotation 13 of the control element 12. The first projection 19 is offset relative to the second projection 23 of the locking element 4 exactly so far and in the same direction along the axis of rotation 13 of the control element 12 as the first bevel surface 20 of the control element 12 and its first and second terminal surfaces 21 and 22 are offset relative to the second bevel surface 24 of the control element 12 and its third and fourth terminal surfaces 25 and 26, specifically, upwardly in FIGS. 2 and 3 by the distance H shown in FIG. 11. Also, the length L of the first projection 19 of the locking element 4 is greater than the length L' of the second projection 23 of the locking element 4 by an amount corresponding to the difference between the distance A of the first bevel surface 20 of the control element 12 and of its first and second terminal surfaces 21 and 22 from the axis of rotation 13 of the control element 12 and the distance A' of the second bevel surface 24 of the control element 12 and of its third and fourth terminal surfaces 25 and 26 from the axis of rotation 13 of the control element 12.

Figure 6:
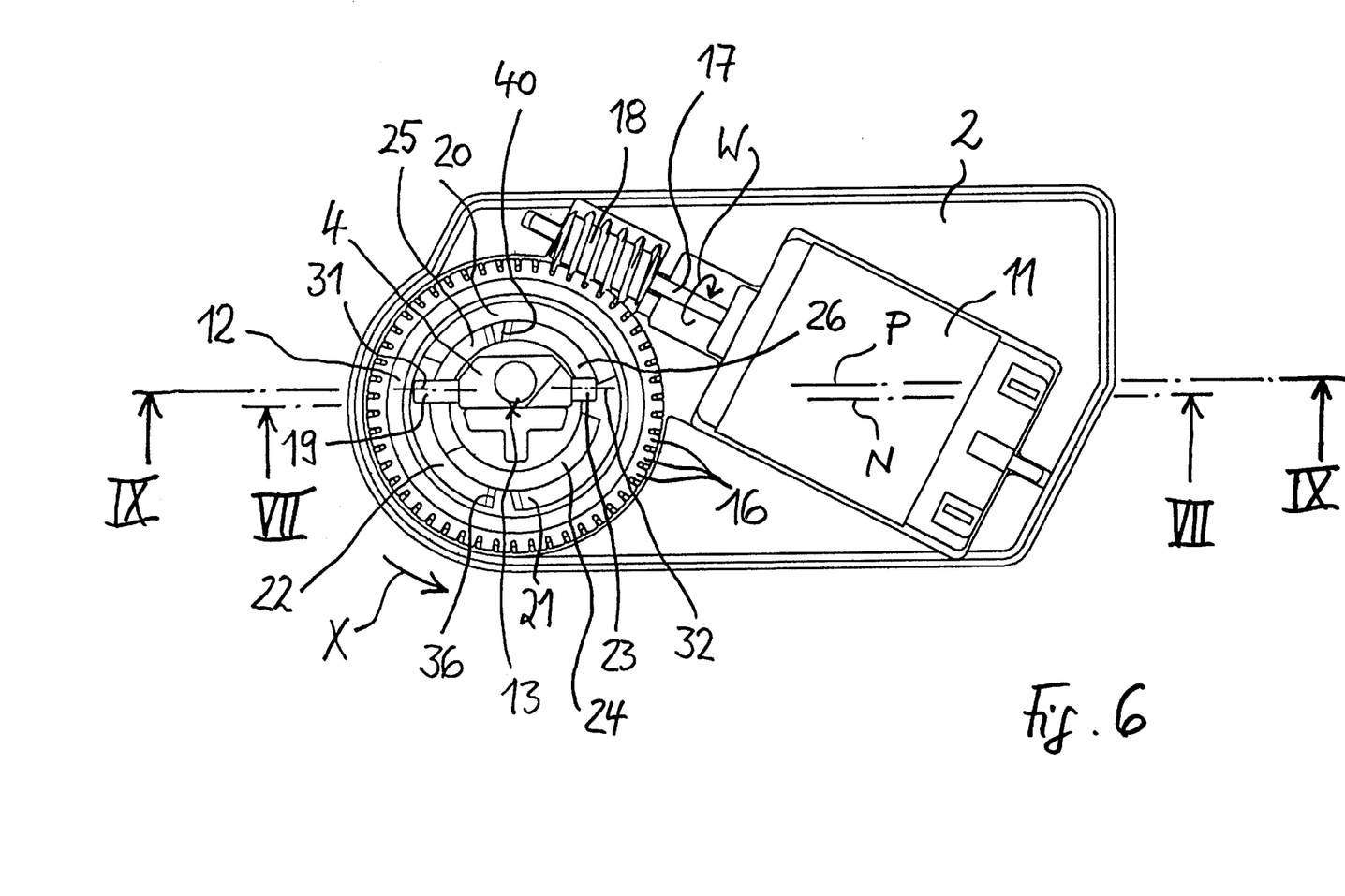
FIG. 6 is a top view similar to FIG. 1 with the lock in the unlocked condition.

As shown in FIGS. 3 and 6, the plane P including the longitudinal axis 31 of the first projection 19 and the longitudinal axis 32 of the second projection 23 of the locking element 4 is offset from the axis of rotation 13 of the control element 12. The axis of rotation 13 of the control element 12 and the plane N including the axis of rotation 13 extend parallel to and at a slight distance from the plane P.

As shown especially clearly in FIGS. 10 through 12, the control element 12 includes at the end 33 of the first terminal surface 21 remote from the first bevel surface 20 and at the end 34 of the second terminal surface 22 remote from the first bevel surface 20 inner stop surfaces 35 and 36, respectively, the stop surfaces 35 and 36 extending parallel to the axis of rotation 13 of the control element 12. The stop surfaces 35 and 36 are associated and cooperate with the first projection 19 of the locking element 4. The control element 12 also includes at the end 37 of the third terminal surface 25 remote from the second bevel surface 24 and at the end 38 of the fourth terminal surface 26 remote from the second bevel surface 24 inner stop surfaces 39 and 40, respectively, these stop surfaces 39 and 40 also extending parallel to the axis of rotation 13 of the control element 12. The stop surfaces 39 and 40 are associated and cooperate with the second projection 23 of the locking element 4.

The first bevel surface 20 of the control element 12 and its first and second terminal surfaces 21 and 22, as well as the second bevel surface 24 of the control element 12 and its third and fourth terminal surfaces 25 and 26, extend jointly over a sector angle a of about 360°, that is, they extend almost entirely around the axis of rotation 13 of the control element 12, only excluding the minimal spacing between the two stop surfaces 35, 36 and respectively the two stop surfaces 39, 40. The first level surface 20 of the control element 12 and its first and second terminal surfaces 21 and 22, as well as the second bevel surface 24 of control element 12 and its third and fourth terminal surfaces 25 and 26, each extend over a sector angle β of about 120°. The first terminal surface 21 (the lower in FIGS. 11 and 12) as well as the fourth terminal surface 26 (the upper in FIGS. 11 and 12) are located in the same plane R which extends orthogonal to the axis of rotation 13 of the control element 12.

A helical compression spring 41 is mounted between the locking element 4 and the cover 1 of the housing 2 and biases the first projection 19 of the locking element 4 against the first bevel surface 20 of the control element 12 and its first and second terminal surfaces 21 and 22, and also urges the second projection 23 of the locking element 4 against the second bevel surface 24 of the control element 12 and its third and fourth terminal surfaces 25 and 26.

As shown most clearly in FIG. 9, the first and second projections 19 and 23 of the locking element 4 each comprises a cylindrical pin 42, 43 force-fitted into a cylindrical, transverse borehole 44, 45, respectively, of the locking element 4.

The control element 12 is a diecasting. It may be manufactured very economically using metal or plastic materials and a diecasting machine.

Figure 1:
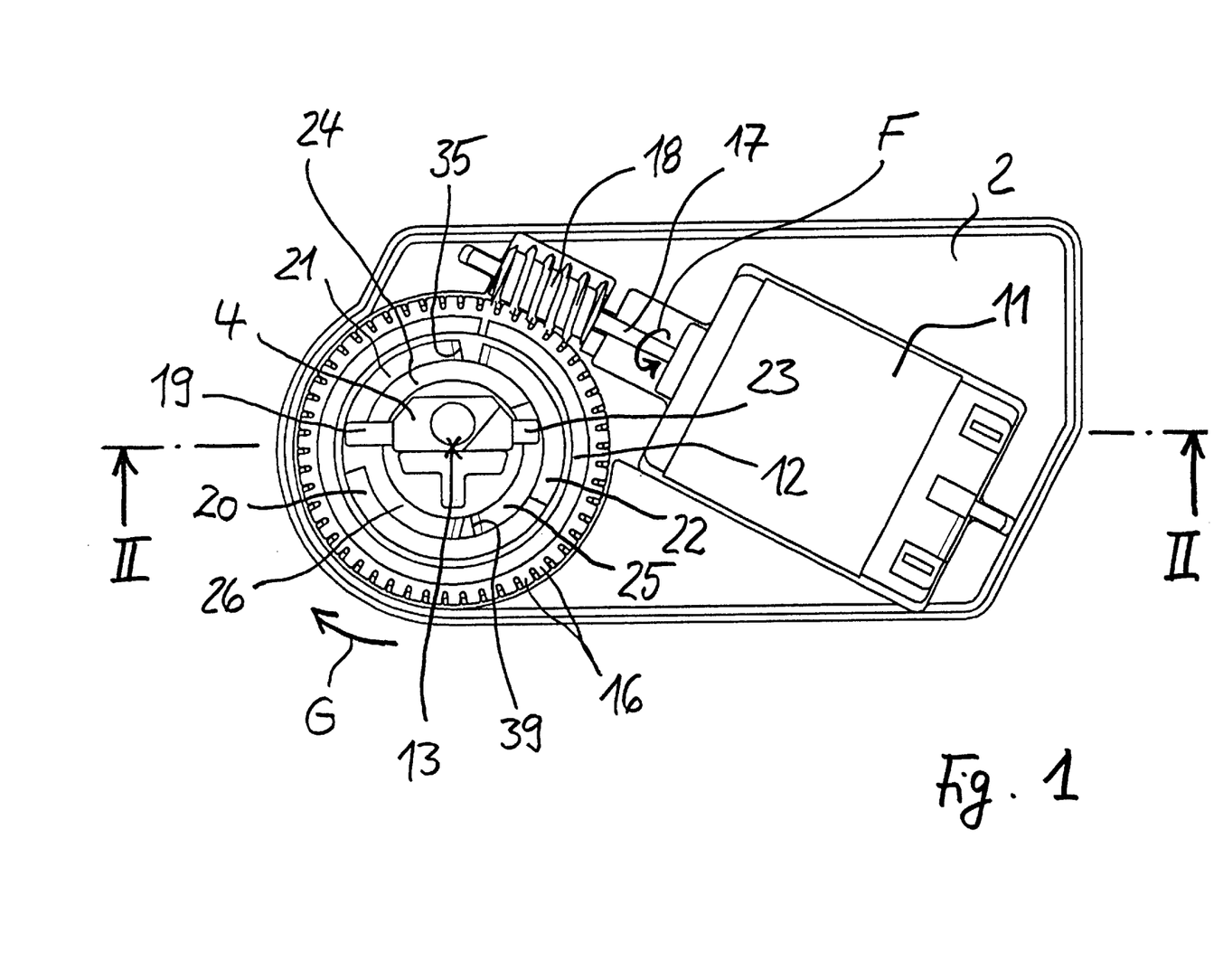
FIG. 1 is a top view taken in the direction of the arrow I of FIG. 2 showing the lock in locked condition and with the cover removed.

The above described motor vehicle steering column lock operates as follows:

When the locking element 4 is in the locked position, its first projection 19 will rest on the first terminal surface 21 of control element 12, and its second projection 23 will rest on the third terminal surface 25 of control element 12, as shown in FIGS. 1 and 2. In order to displace the locking element 4 against the bias of the helical compression spring 41 out of the locked position and axially in the direction of the arrow E of FIG. 2 into the unlocked position, power is applied to the electric motor 11 which then rotates the drive pinion or worm 18 in the direction of the arrow F which drives the control element 12 in the direction of the arrow G as shown in FIG. 1. As a result, the first terminal surface 21 below the first projection 19 and the third terminal surface 25 beneath the second projection 23 move away and the first projection 19 moves onto the first bevel surface 20 and the second projection 23 onto the second bevel surface 24 of the control element 12, and they move on said surfaces to the second and fourth terminal surfaces 22 and 26 of control element 12. The first projection 19 reaches and moves onto the second terminal surface 22 and the second projection 23 reaches and moves onto the fourth terminal surface 26 in a rotational position (not shown) of the control element 12 shortly before the rotational position shown in FIG. 6. In this rotational position (not shown) of the control element 12, the locking element 4 has reached the unlocked position where it then remains even when the control element 12 continues rotating in the direction of the arrow G into the rotational position shown in FIG. 6 and beyond the latter until the two stop surfaces 36 and 40 of the control element 12 at the end 34 of the second terminal surface 22 and at the end 38 of the fourth terminal surface 26 come to rest against the first and second projections 19 and 23, respectively. The excursion available to the control element 12 in the direction of the arrow G through an angle of rotation of about 120° is reliably sufficient, as regards the rotation carried out by the control element 12, after the power to the electric motor 11 is shut off by means of a limit switch 46 actuated by the locking element 4 when it reaches its unlocked position, and until the electric motor 11 actually stops running.

In order to allow axial displacement in the direction of the arrow V of FIG. 7 of the locking element 4 under the influence of the helical compression spring 41 from the unlocked position to the locked position, the electric motor 11 is turned on in such a way that it rotates in the opposite direction to that described above so that the electric motor 11 rotates both the drive pinion or worm 18 and the control element 12 in the opposite direction, namely in the direction of the arrow W and respectively the arrow X in FIG. 6. Said axial displacement of the locking element 4 begins as soon as the first projection 19 of the locking element 4 moves from the second terminal surface 22 onto the first bevel surface 20 of the control element 12 and the second projection 23 of the locking element 4 moves from the fourth terminal surface 26 onto the second bevel surface 24 of the control element 12. The axial motion of the locking element 4 ends as soon as the first projection 19 has moved from the first bevel surface 20 onto the first terminal surface 21 and the second projection 23 has moved from the second bevel surface 24 onto the third terminal surface 25. Thereupon the control element 12 may be rotated in the direction of the arrow X into the rotational position of FIG. 1 and beyond the latter until the two stop surfaces 35 and 39 of the control element 12 at the ends 33 and 37 of the first and third terminal surfaces 21 and 25 respectively engage the first and second projections 19 and 23. This run-down possibility for the control element 12 in the direction of the arrow X through an angle of rotation of about 120°, is certainly sufficient in view of the rotation which is carried out by the control element 12 following power cutoff to the electric motor 11 at the end of a predetermined period of applied power, until the electric motor 11 does in fact come to a stop.

Figure 4:
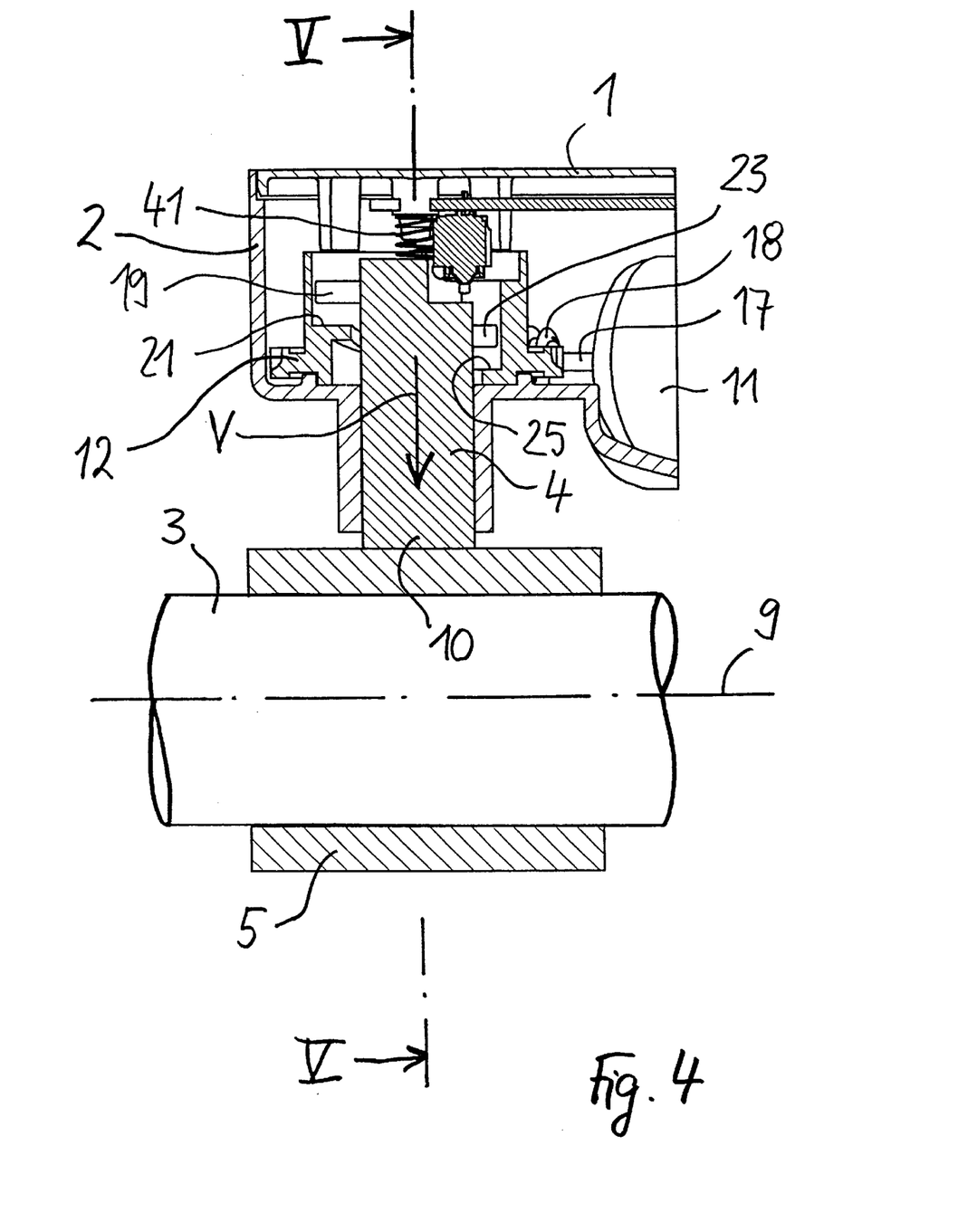
FIG. 4 is a section view similar to FIG. 2, with the locking element in a ready to lock position.
Figure 5:
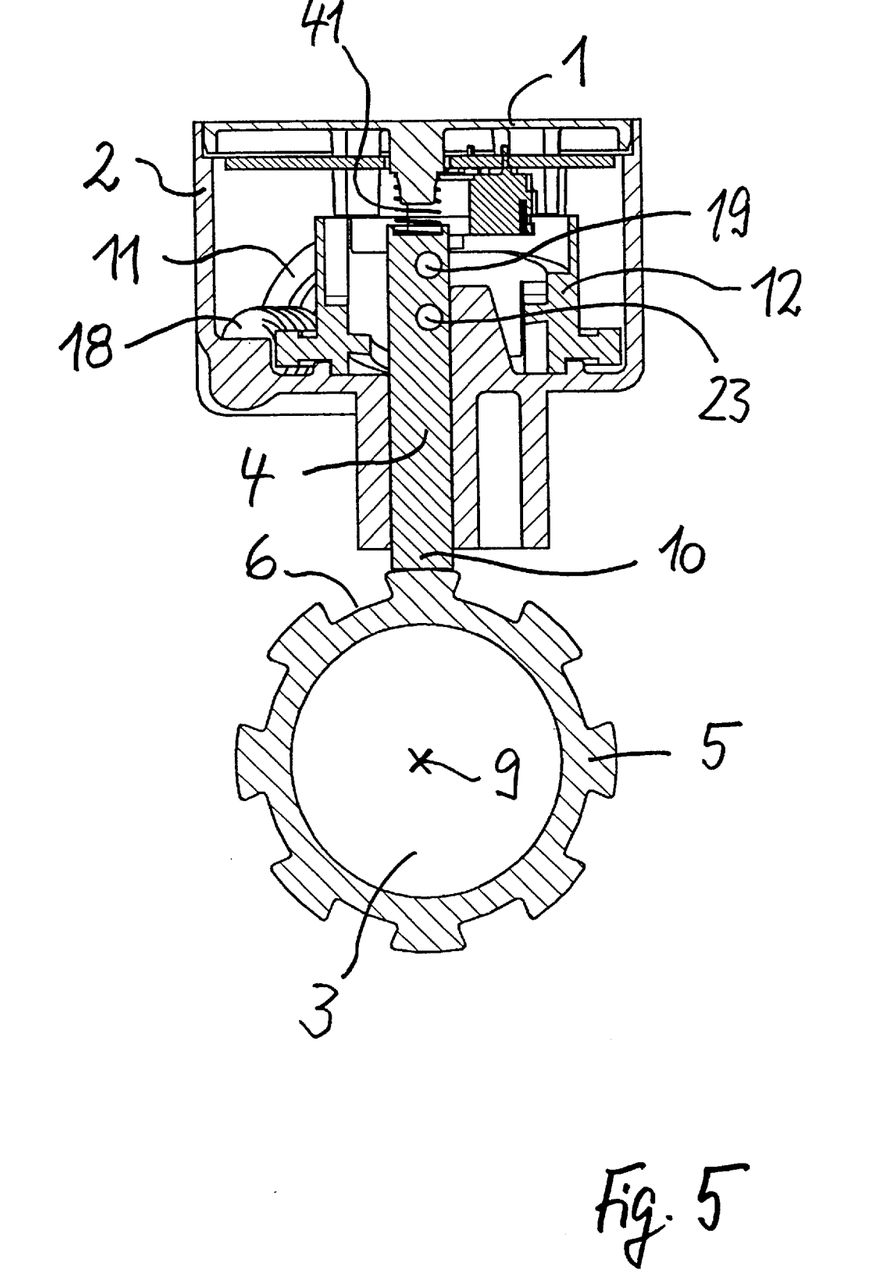
FIG. 5 is a section taken along line V—V of FIG. 4.

As shown in FIGS. 4 and 5, the control element 12 may be rotated freely in the direction of the arrow X (FIG. 6) into the rotational position of FIG. 1, even if a locking channel 6 in the locking bush 5 seated on the steering column 3 is not aligned with the locking element 4 so as to receive its free end 10. As soon as the steering column 3 has been rotated in such a way that one of the two locking channels 6 of the locking bush 5 which are adjacent to the locking element 4, is aligned with the locking element 4, the locking element 4 is displaced by means of the helical compression spring 41 in the direction of the arrow V of FIG. 4 in order to engage by its end 10 the aligned locking channel 6 and to assume the locked position shown in FIGS. 2 and 3

It is to be understood that the invention has been described with respect to a preferred embodiment and that variations of the described structure coming within the knowledge of persons skilled in the art yet not substantively changing the invention can be made without departing from the invention as defined in the claims that follow.

What is claimed is:

1. A motor vehicle steering column lock, comprising a locking element including two radial projections and displaceable reciprocally between locked and unlocked positions; a control element driveable rotationally in opposite directions by a drive and arranged to axially displace said locking element in opposite directions; said control element surrounding the locking element and comprising first and second inner bevel surfaces which cooperate with said two radial projections of the locking element, said projections being located on mutually diametrically opposite sides of the axis of rotation of the control element, each of said first and second inner bevel surfaces merging at their respective ends into respective first and second, and third and fourth, terminal surfaces located in respective planes extending orthogonal to the axis of rotation of the control element; the first one of the bevel surfaces of the control element and the respective first and second terminal surfaces of the first bevel surface being offset from the second one of the bevel surfaces of the control element and the respective third and fourth terminal surfaces of the second bevel surface along the direction of the axis of rotation of the control element, said first and second bevel surfaces and their respective terminal surfaces being located at different distances away from and extending around the axis of rotation of the control element; the two projections of the locking element being mounted in a stationary manner relative to the locking element and the first projection of the locking element which cooperates with the bevel surface of the control element that is located farther away from the axis of rotation of the control element and with its respective terminal surfaces located farther away from the axis of rotation of the control element being located commensurately spaced along the axis of rotation of the control element relative to and having a commensurately longer length than the second projection of said locking element which is arranged to cooperate with the second bevel surface of the control element and with its respective terminal surfaces.

2. The lock as claimed in claim 1, wherein the control element comprises a stop surface at the end of each terminal surface remote from the bevel surface merging into said terminal surface, said stop surface cooperating with that projection of the locking element which cooperates with said terminal surface.

3. The lock as claimed in claim 1, wherein each bevel surface of the control element and its respective two terminal surfaces collectively extend over a sector angle ($\alpha$) of approximately 360°.

4. The lock as claimed in claim 3, wherein each bevel surface of the control element and each of its respective two terminal surfaces extends over a sector angle ($\beta$) of about 120°.

5. The lock as claimed in claim 3, wherein the two terminal surfaces which are associated with one bevel surface and respectively the other bevel surface of the control element and which are mutually adjacent along the direction of the axis of rotation of the control element are situated in a same plane (R) that extends orthogonally relative to the axis of rotation of the control element.

6. The lock as claimed in claim 1, wherein the control element has a tubular shape.

7. The lock as claimed in claim 1, wherein the control element includes outer teeth arranged to mesh with a drive pinion or a drive worm.

8. The lock as claimed in claim 1, wherein the control element is a diecasting.

9. The lock as claimed in claim 1, including a spring device arranged to bias the locking element in such manner that the projections of the locking element are urged against the bevel surfaces of the control element and terminal surfaces of said bevel surfaces.

10. The lock as claimed in claim 1, wherein the axis of rotation of the control element is offset from a plane (P) extending parallel to the axis of rotation of the control element and including the longitudinal axes of the projections of the locking element.

11. The lock as claimed in claim 1, wherein the projections of the locking element each comprise a pin force-fitted into a transverse borehole of the locking element.

12. The lock as claimed in claim 1, wherein said drive comprises a reversible electric motor.

* * * * *